United States Patent
Hirota et al.

(10) Patent No.: US 11,612,869 B2
(45) Date of Patent: Mar. 28, 2023

(54) PRODUCTION METHOD FOR TRICHLOROSILANE, AND PIPE

(71) Applicant: TOKUYAMA CORPORATION, Yamaguchi (JP)

(72) Inventors: Kenji Hirota, Yamaguchi (JP); Katsuya Ogihara, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 205 days.

(21) Appl. No.: 16/765,071

(22) PCT Filed: Nov. 16, 2018

(86) PCT No.: PCT/JP2018/042555
§ 371 (c)(1),
(2) Date: May 18, 2020

(87) PCT Pub. No.: WO2019/098343
PCT Pub. Date: May 23, 2019

(65) Prior Publication Data
US 2020/0368705 A1    Nov. 26, 2020

(30) Foreign Application Priority Data
Nov. 20, 2017   (JP) .............................. JP2017-223146

(51) Int. Cl.
*B01J 4/00*       (2006.01)
*B01J 8/24*       (2006.01)
*C01B 33/107*     (2006.01)

(52) U.S. Cl.
CPC .................. *B01J 4/008* (2013.01); *B01J 8/24* (2013.01); *C01B 33/10763* (2013.01); *B01J 2204/007* (2013.01); *B01J 2208/00194* (2013.01)

(58) Field of Classification Search
None
See application file for complete search history.

(56) References Cited

U.S. PATENT DOCUMENTS

| 4,130,632 A  * | 12/1978 | Braunsperger ........ C01B 33/107 423/493 |
| 6,602,482 B2 * | 8/2003 | Kohler .................... A62C 13/78 423/493 |

(Continued)

FOREIGN PATENT DOCUMENTS

| CN | 101279734   | 10/2008 |
| CN | 101279735 A | 10/2008 |

(Continued)

OTHER PUBLICATIONS

The Extended European Search Report for EP Patent Application No. 18877773.4, dated May 3, 2021, 7 pages.

(Continued)

*Primary Examiner* — Colin W. Slifka
*Assistant Examiner* — Michael Forrest
(74) *Attorney, Agent, or Firm* — Casimir Jones, SC; Robert A. Goetz

(57) ABSTRACT

To prevent solidified aluminum chloride from adhering to and accumulating on a pipe and also prevent stress-corrosion cracking in the pipe, a method for producing trichlorosilane includes a cooling step of cooling a discharge gas that is discharged from a fluidized-bed reactor and that contains the trichlorosilane, the cooling step involving causing a fluid to flow through a space (4) inside a side wall (3) of a pipe (10), the pipe being a pipe for discharging the discharge gas from the fluidized-bed reactor, in such a manner that the side wall (3) has a surface (1a) having a temperature of not lower than 110° C.

4 Claims, 1 Drawing Sheet

(56) References Cited

U.S. PATENT DOCUMENTS

| | | | |
|---|---|---|---|
| 2001/0053339 A1 | 12/2001 | Kohler et al. | |
| 2001/0053343 A1 | 12/2001 | Kohler et al. | |
| 2009/0104104 A1 | 4/2009 | Inaba | |
| 2010/0074823 A1 | 3/2010 | Inaba | |
| 2010/0183496 A1 | 7/2010 | Narukawa | |
| 2010/0290970 A1* | 11/2010 | Staffin | B01J 8/34 423/342 |
| 2011/0046031 A1 | 2/2011 | Stepp et al. | |
| 2012/0164053 A1 | 6/2012 | Narukawa | |
| 2012/0213687 A1 | 8/2012 | Ishii et al. | |
| 2012/0301385 A1 | 11/2012 | Akiyoshi et al. | |
| 2014/0234197 A1* | 8/2014 | Morita | B01J 8/16 423/342 |

FOREIGN PATENT DOCUMENTS

| | | | |
|---|---|---|---|
| CN | 101417804 A | 4/2009 | |
| CN | 101628720 | 1/2010 | |
| CN | 201505494 | 6/2010 | |
| CN | 101798086 A | 8/2010 | |
| CN | 102030334 | 4/2011 | |
| CN | 201807210 | 4/2011 | |
| CN | 102100998 | 6/2011 | |
| CN | 102101000 | 6/2011 | |
| CN | 201899898 | 7/2011 | |
| CN | 202358928 | 8/2012 | |
| CN | 102753478 A | 10/2012 | |
| CN | 205953540 U * | 2/2017 | ............ Y02P 20/129 |
| EP | 1166844 | 1/2002 | |
| EP | 1174388 | 1/2002 | |
| EP | 2265548 | 2/2013 | |
| JP | 48-047500 | 7/1973 | |
| JP | 63-170210 | 7/1988 | |

OTHER PUBLICATIONS

Office Action for TW Patent Application No. 107140850, dated Oct. 21, 2021, 4 pages.
English Translation of International Preliminary Report on Patentability for PCT/JP2018/042555, dated May 26, 2020, 10 pages.
International Search Report for PCT/JP2018/042555, dated Feb. 19, 2019, 3 pages.
Office action for CN201880074129.3, dated Sep. 27, 2022, 6 pages.

* cited by examiner

PRODUCTION METHOD FOR TRICHLOROSILANE, AND PIPE

TECHNICAL FIELD

The present invention relates to a method for producing trichlorosilane and a pipe for use in the production method.

BACKGROUND ART

Polycrystalline silicon, which is used as a material of a semiconductor or the like, is made of trichlorosilane as a raw material. Trichlorosilane is produced by, for example, a means involving use of a fluidized-bed reactor. Specifically, a fluidized-bed reactor is used to cause metallurgical grade silicon powder and hydrogen chloride gas to react with each other for production of trichlorosilane. The fluidized-bed reactor discharges a gas containing trichlorosilane produced. The trichlorosilane is collected from the discharge gas for production of trichlorosilane. A fluidized-bed reactor discharges a gas containing not only trichlorosilane but also aluminum chloride, for example.

Collecting trichlorosilane from a discharge gas requires cooling the discharge gas. As a means of cooling a gas discharged from a fluidized-bed reactor, Patent Literature 1, for example, discloses a method including, as illustrated in (a) of FIG. 2, externally bringing cooling water into contact with a side wall 101 of a pipe 100 including an inner-space section 102 through which a discharge gas flows. Specifically, the method includes (i) bringing cooling water into contact with the side wall 101 to condense a discharge gas flowing through the inner-space section 102 and (ii) further condensing the above-condensed discharge gas with use of a compressor, for collection of trichlorosilane.

CITATION LIST

Patent Literature

[Patent Literature 1]
Chinese Patent Application Publication No. 101279734, specification

SUMMARY OF INVENTION

Technical Problem

Cooling water has a temperature that is much lower than the sublimation temperature (approximately 160° C.) of aluminum chloride. Cooling a discharge gas by bringing cooling water into contact with a side wall of the pipe 100 thus causes aluminum chloride contained in the discharge gas to solidify locally. Such solidified aluminum chloride adheres to and accumulates on the pipe 100, thereby unfortunately blocking the pipe 100.

As a means of cooling a discharge gas while preventing the pipe 100 from being blocked as above, a means is known of (i) externally bringing high-temperature water into contact with the side wall 101 of the pipe 100 including an inner-space section 102 through which a discharge gas flows and (ii) causing the high-temperature water to evaporate, in order to cool the discharge gas. This means, however, involves the following issue: When high-temperature water evaporates, that surface of the side wall 101 which has come into contact with the high-temperature water undergoes a sharp temperature drop. That portion of the pipe 100 which has undergone the temperature drop suffers from stress-corrosion cracking.

An aspect of the present invention has been accomplished in view of the above issue. It is an object of the prevent invention to prevent solidified aluminum chloride from adhering to and accumulating on a pipe and also prevent stress-corrosion cracking in the pipe.

Solution to Problem

In order to attain the above object, a method as an aspect of the present invention for producing trichlorosilane includes a cooling step of cooling a discharge gas that is discharged from a fluidized-bed reactor configured to produce the trichlorosilane and that contains the trichlorosilane, the cooling step involving causing a fluid to flow through a space inside a side wall of a pipe, the pipe being a pipe for discharging the discharge gas from the fluidized-bed reactor, in such a manner that the side wall has a surface with which the discharge gas flowing through the space is in contact, the surface having a temperature of not lower than 110° C.

A pipe as an aspect of the present invention is a pipe for discharging a discharge gas that is discharged from a fluidized-bed reactor configured to produce trichlorosilane and that contains the trichlorosilane, the pipe including: side walls including (i) a first wall having a surface with which the discharge gas comes into contact and (ii) a second wall provided outward of the first wall, the first wall and the second wall defining therebetween a space through which a fluid is caused to flow.

Advantageous Effects of Invention

An aspect of the present invention can prevent solidified aluminum chloride from adhering to and accumulating on a pipe and also prevent stress-corrosion cracking in the pipe.

DESCRIPTION OF EMBODIMENTS

1. Method for Producing Trichlorosilane

Figure 1:
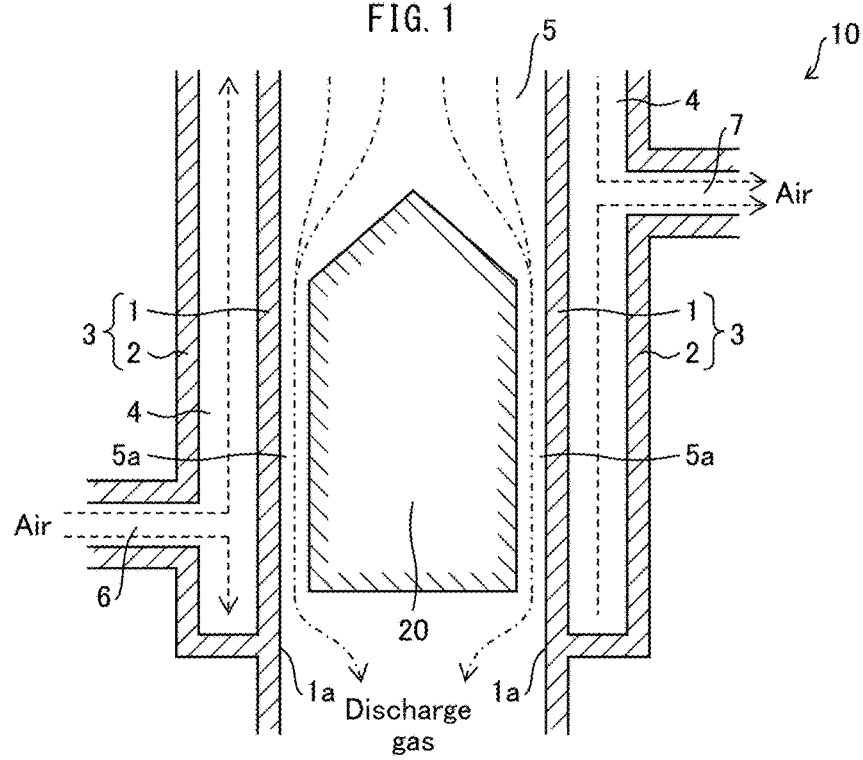
FIG. 1 is a cross-sectional view of a pipe for use in cooling a discharge gas, and schematically illustrates the structure of the pipe.
Figure 2:
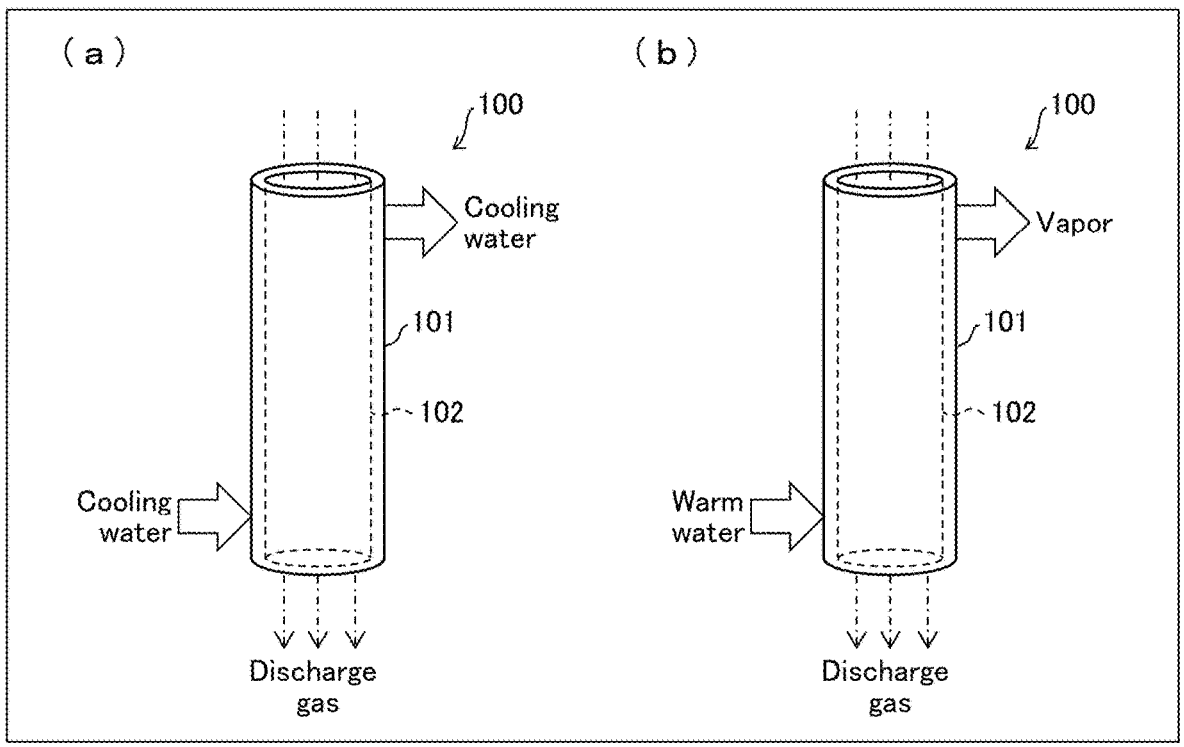
FIG. 2 provides diagrams each schematically illustrating how a discharge gas is cooled.

A method according to the present embodiment for producing trichlorosilane ($SiHCl_3$) includes a reaction step and a cooling step. Note that flows of the metal silicon powder and the hydrogen chloride gas to a later-described fluidized-bed reactor (not shown) are not described here, since descriptions thereof are provided in, for example, Japanese Patent Application Publication, *Tokukai*, No. 2011-184242, which can be incorporated herein as necessary. Further, a flow of trichlorosilane which has been discharged from a later-described pipe 10 is not described here, since descriptions thereof are provided in, for example, Japanese Patent Application Publication, *Tokukai*, No. 2015-089859.

<1-1. Reaction Step>

First, the reaction step involves causing metallurgical grade silicon powder and hydrogen chloride (HCl) to react with each other for production of trichlorosilane. The metallurgical grade silicon powder for use in production of trichlorosilane is, for example, a solid substance that contains elemental silicon in metal form, such as metallurgical metal silicon, ferrosilicon, or polysilicon (Si), and may be any publicly known one of such materials.

Metallurgical grade silicon powder may contain some impurity (impurities) such as an iron compound. The constituents and amounts of such impurities are not particularly limited. Usually, metallurgical grade silicon powder is used in the form of fine powder having an average particle diameter of about 150 to 350 μm.

The hydrogen chloride for use in production of trichlorosilane can be any of various kinds of industrially available hydrogen chloride.

The present embodiment involves use of a fluidized-bed reactor for production of trichlorosilane. The fluidized-bed reactor is a reaction device configured to cause metallurgical grade silicon powder and hydrogen chloride to react with each other for production of trichlorosilane, and may be any publicly known one. The use of a fluidized-bed reactor makes it possible to continuously supply metallurgical grade silicon powder and hydrogen chloride and thereby continuously synthesize trichlorosilane. The amount of supply of the metallurgical grade silicon powder and the hydrogen chloride is not particularly limited, provided that the metallurgical grade silicon powder and the hydrogen chloride can be supplied at a speed that achieves a flow rate at which a fluid bed can form.

The temperature at which the foregoing reaction is carried out is selected appropriately in consideration of the material and capacity of the reactor, catalyst, and the like. Generally, the temperature at which the reaction is carried out is set to fall within the range of from 200° C. to 500° C., preferably within the range of from 250° C. to 450° C.

During the reaction step, main reactions that occur inside the fluidized-bed reactor are represented by Formulae 1 and 2 below.

$$Si+3HCl \rightarrow SiHCl_3 + H_2 \quad \text{[Formula 1]}$$

$$Si+4HCl \rightarrow SiCl_4 + 2H_2 \quad \text{[Formula 2]}$$

Trichlorosilane produced in the fluidized-bed reactor is discharged as part of a discharge gas. The discharge gas contains not only trichlorosilane but also hydrogen, unreacted tetrachlorosilane/metallurgical grade silicon powder, other chlorosilane compounds, and aluminum chloride.

For a method according to an aspect of the present invention for producing trichlorosilane (specifically, a reaction step), the method for producing trichlorosilane is not limited to a method that includes causing metallurgical grade silicon powder and hydrogen chloride to react with each other. The method may include, for example, converting silicon tetrachloride ($SiCl_4$) as a by-product of a step of depositing polysilicon during production of polysilicon or dry silica gel into trichlorosilane (STC reduction reaction [AX reaction]) for reuse. The conversion into trichlorosilane is represented by Formula 3 below.

$$Si+3SiCl_4+2H_2 \rightarrow 4SiHCl_3 \quad \text{[Formula 3]}$$

<1-2. Cooling Step>

Next, the cooling step involves cooling a discharge gas from the fluidized-bed reactor with use of the pipe 10 illustrated in FIG. 1. Specifically, the cooling step involves cooling a discharge gas inside the pipe 10 by causing air (fluid) with a temperature of not lower than 30° C. to flow through a space 4 inside the side wall 3 so that a first wall 1 (which is part of the side wall) with which the flowing discharge gas is in contact has a surface 1a with a temperature of not lower than 110° C. In particular, the surface 1a of the first wall 1 (which is part of the side wall) has a temperature of preferably not lower than 120° C. Carrying out the cooling step allows unreacted metallurgical grade silicon powder contained in a discharge gas to be removed downstream with use of a sintered metal filter (not shown).

The pipe 10 is a piece of equipment for discharging a discharge gas from the fluidized-bed reactor, and includes a side wall 3 having a substantially cylindrical shape as illustrated in FIG. 1. The side wall 3 includes a first wall 1 having a surface 1a with which a discharge gas comes into contact and a second wall 2 provided outward of the first wall 1. The first wall 1 and the second wall 2 define therebetween a space 4 through which air is caused to flow.

The second wall 2 has, on a first side thereof, a first opening section 6 for guiding air into the space 4. The first opening section 6 and the space 4 communicate with each other. The second wall 2 has, on a second side thereof, a second opening section 7 for discharging air to the outside. The second opening section 7 and the space 4 communicate with each other.

A discharge gas flows through an inner-space section 5 that is surrounded and defined by the surface 1a of the first wall 1 and that has a cylindrical shape. The inner-space section 5 contains, in a vertically lower zone thereof, an inner shell 20 having a diameter smaller than the inner diameter of the pipe 10 (that is, the diameter of the inner-space section 5). The above zone (that is, a zone as at least a portion of the inner-space section) includes a narrow-path zone 5a, in which the inner shell 20 is provided to narrow a channel for a discharge gas. Providing the inner shell 20 in the above vertically lower zone preferably reduces the cross-sectional area of the inner-space section 5 in that zone to 1% to 10%, particularly 1% to 5%, of the rest of the channel for a discharge gas.

The inner shell 20 has a body having a cylindrical outer shape. The inner shell 20 also has a tip portion that is continuous with the body and that faces in the direction from which a discharge gas flows in the inner-space section 5, the tip portion having a conical outer shape. The tip portion having a conical shape as such allows a discharge gas to flow smoothly and thereby reduces a pressure loss as compared to other shapes.

The present embodiment is not limiting as an example in terms of, for example, the respective shapes and sizes of the pipe 10 and inner shell 20 and placement of the inner shell 20 in the inner-space section 5. Any change may be made to, for example, the respective designs of the respective thicknesses of the first and second walls 1 and 2, the size of the space 4, the shape of the inner-space section 5 and the corresponding outer shape of the inner shell 20, and the respective sizes and arrangement of the first and second opening sections 6 and 7. Further, the inner shell 20 is not necessarily positioned in the inner-space section 5.

The condition for depositing aluminum chloride is most stringent at an exit portion among different portions of the pipe 10 which exit portion is near the inner shell 20. In other words, the temperature of the discharge gas is at its lowest at the exit portion. Thus, in order to prevent aluminum chloride from locally depositing or adhering inside the pipe 10, the discharge gas needs to have a temperature exceeding the sublimation temperature of aluminum chloride (that is, approximately 160° C.) when the discharge gas flows through the inner-space section 5 at the exit portion. To meet the need, the surface 1a at the exit portion needs to have a temperature kept at not lower than 110° C. while the discharge gas is cooled.

The cooling step of the present embodiment, in view of the above need, involves causing air to flow through the space 4 of the pipe 10 in such a manner that the surface 1a of the first wall 1 has a temperature of not lower than 110° C. This allows the surface 1a at the exit portion to have a temperature of not lower than 110° C. when the discharge gas is cooled. Thus, the discharge gas flowing through the pipe 10 is at least not cooled to a temperature lower than the sublimation temperature of aluminum chloride. The above arrangement, as a result, effectively prevents aluminum chloride in a discharge gas from solidifying locally, and thereby prevents solidified aluminum chloride from adhering to and depositing on the pipe.

The method according to the present embodiment for producing trichlorosilane involves measuring the temperature of the surface 1a of the first wall 1 by providing, for example, a K thermocouple on a wall surface.

The cooling step according to the present embodiment involves causing air to flow through the space 4 inside the side wall 3 while a discharge gas is flowing through the pipe 10. Thus, at least the surface 1a of the first wall 1 does not have a sharp temperature difference in the up-down direction. This prevents stress-corrosion cracking in the pipe 10. The cooling step also involves using air with a temperature of not lower than 30° C. to flow through the space 4. This more reliably causes the surface 1a of the first wall 1 to have a temperature of not lower than 110° C. than, for example, a later-described case of causing high-temperature water to flow. This further reduces the risk of the above stress-corrosion cracking.

The fluid caused to flow through the space 4 inside the side wall 3 is not limited to air, and may alternatively be, for example, oil or high-temperature water (with a temperature of not lower than 100° C.) described later. The fluid may be, in other words, any fluid that causes the first wall 1 (with which the flowing discharge gas is in contact) of the pipe 10 to have a surface 1a with a temperature of not lower than 110° C.

The pipe 10 has a narrow-path zone 5a in a vertically lower zone of the inner-space section 5. The distance between a discharge gas and the surface 1a of the first wall 1 is shorter while the discharge gas passes through the narrow-path zone 5a than during the discharge gas passes through other zones. This allows the discharge gas to be cooled more efficiently while the discharge gas passes through the narrow-path zone 5a than while the discharge gas passes through other zones. The narrow-path zone 5a is present in a vertically lower zone of the inner-space section 5, that is, at an exit portion of the pipe 10. This allows the discharge gas to pass through the sintered metal filter in a state where the discharge gas has been cooled most.

2. Variation of Cooling Step

The cooling step according to the present embodiment preferably involves causing air or another fluid to flow through the space 4 inside the side wall 3 in such a manner that the surface 1a has a temperature (surface temperature) of less than 125° C. at an exit portion of the pipe 10, specifically, at the lowermost portion of the side wall 3.

Causing the surface 1a to have a temperature of less than 125° C. at the exit portion reliably cools the discharge gas to approximately 190° C. while the discharge gas flows through the inner-space section 5 at the exit portion. This reliably cools the discharge gas to a temperature not higher than the heat-resistant temperature of a Teflon (registered trademark) gasket included in the sintered metal filter. This allows the sintered metal filter to be stably provided directly below the exit portion of the pipe 10.

The cooling step according to the present embodiment may involve causing high-temperature water with a temperature of not lower than 100° C. instead of air to flow through the space 4 inside the side wall 3. In a case where high-temperature water with a temperature of not lower than 100° C. is caused to flow, the pipe 10 may be shorter than in the case where, for instance, air is caused to flow. This can prevent solidified aluminum chloride from depositing on the pipe, and allows the facility for producing trichlorosilane to be compact.

<Recap>

In order to attain the above object, a method as an aspect of the present invention for producing trichlorosilane includes a cooling step of cooling a discharge gas that is discharged from a fluidized-bed reactor configured to produce the trichlorosilane and that contains the trichlorosilane, the cooling step involving causing a fluid to flow through a space inside a side wall of a pipe, the pipe being a pipe for discharging the discharge gas from the fluidized-bed reactor, in such a manner that the side wall has a surface with which the discharge gas flowing through the space is in contact, the surface having a temperature of not lower than 110° C.

The method as an aspect of the present invention for producing trichlorosilane may be arranged such that the cooling step involves causing the fluid to flow through the space in such a manner that the side wall has a lowermost portion having a surface temperature of lower than 125° C.

The method as an aspect of the present invention for producing trichlorosilane may be arranged such that the fluid is air having a temperature of not lower than 30° C.

The method as an aspect of the present invention for producing trichlorosilane may be arranged such that the fluid is high-temperature water having a temperature of not lower than 100° C.

A pipe as an aspect of the present invention is a pipe for discharging a discharge gas that is discharged from a fluidized-bed reactor configured to produce trichlorosilane and that contains the trichlorosilane, the pipe including: side walls including (i) a first wall having a surface with which the discharge gas comes into contact and (ii) a second wall provided outward of the first wall, the first wall and the second wall defining therebetween a space through which a fluid is caused to flow.

A pipe as an aspect of the present invention is an inner shell in an inner-space section of the pipe through which inner-space section the discharge gas flows, the inner shell having a diameter smaller than an inner diameter of the pipe, wherein the inner-space section has a narrow-path zone in at least a partial zone of the inner-space section, the narrow-path zone being a zone in which the discharge gas flows through a channel narrowed by the inner shell.

3. Examples

For the present example, metallurgical grade silicon powder and hydrogen chloride (HCl) were caused to react with each other in a fluidized-bed reactor for production of trichlorosilane. A discharge gas discharged from the fluidized-bed reactor after the production of trichlorosilane and having a temperature of 350° C. was cooled by causing the discharge gas to flow through the inner-space section 5 of the pipe 10 illustrated in FIG. 1. The cooling operation was carried out by supplying air with a temperature of 45° C. through the first opening section 6 to the space 4 inside the side wall 3 of the pipe 10 and causing the air having a temperature raised to 143° C. to be discharged through the second opening section 7. The pipe 10 was structured such that the channel for a discharge gas was reduced to 2% of the cross-sectional area of the inner-space section at that portion of the inner-space section 5 at which the inner shell 20 was provided.

During the cooling operation, a measurement was made, with use of a K thermocouple provided on a wall surface, of the temperature of the surface 1a of the first wall 1 at a lower end portion (that is, an exit portion) of the side wall 3 at which lower end portion the space 4 was provided. The temperature was measured at three positions on the lower end portion that were evenly spaced apart from one another in the circumferential direction. At each position, the temperature was approximately 120° C., and was thus higher than 110° C. A measurement was also made, with use of a thermocouple thermometer, of the temperature of the discharge gas having passed through the lower end portion. The temperature measured was approximately 190° C., and was higher than the sublimation temperature of aluminum chloride (that is, approximately 160° C.).

The discharge gas that flowed through the pipe 10 had its lowest temperature at the lower end portion (that is, exit portion) at which the space 4 was provided. Thus, the lower end portion having a temperature higher than 110° C. as described above meant that the temperature of the aluminum chloride in the discharge gas was kept at not lower than its sublimation (solidification) temperature upstream of the lower end portion. This showed that the operation could be continued without dirtying the heating surface (which is important for heat exchange) with depositing and adhering of aluminum chloride.

4. Supplemental Notes

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention is applicable to production of trichlorosilane.

REFERENCE SIGNS LIST

1 First wall
1a Surface
2 Second wall
3 Side wall
4 Space
5 Inner-space section
5a Narrow-path zone
10 Pipe
20 Inner shell

What is claimed is:

1. A method for producing trichlorosilane, the method comprising:
    a cooling step of cooling a discharge gas that is discharged from a fluidized-bed reactor configured to produce the trichlorosilane and that contains the trichlorosilane,
    in the cooling step,
        by causing a fluid to flow through a space inside a side wall of a pipe in such a manner that the side wall has a surface at a temperature of not lower than 110° C., the discharge gas being cooled so that in the pipe upstream of a lower end portion of the wall where the space is provided, the discharge gas flowing through the pipe is kept at a temperature of not lower than a sublimation temperature of aluminum chloride, the pipe being a pipe for discharging the discharge gas from the fluidized-bed reactor, the discharge gas flowing through the pipe being in contact with the surface.

2. The method according to claim 1, wherein the cooling step involves causing the fluid to flow through the space in such a manner that the side wall has a lowermost portion having a surface temperature of lower than 125° C.

3. The method according to claim 1, wherein the fluid is air having a temperature of not lower than 30° C.

4. The method according to claim 1, wherein the fluid is high-temperature water having a temperature of not lower than 100° C.

* * * * *